US012288105B2

(12) United States Patent
Nishida et al.

(10) Patent No.: US 12,288,105 B2
(45) Date of Patent: Apr. 29, 2025

(54) ENVIRONMENT CONSTRUCTION SYSTEM AND ENVIRONMENT CONSTRUCTION METHOD

(71) Applicant: Hitachi, Ltd., Tokyo (JP)

(72) Inventors: Toshio Nishida, Tokyo (JP); Masaharu Ukeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 436 days.

(21) Appl. No.: 17/950,194

(22) Filed: Sep. 22, 2022

(65) Prior Publication Data

US 2024/0103930 A1    Mar. 28, 2024

(30) Foreign Application Priority Data

Dec. 13, 2021   (JP) ................................. 2021-201650

(51) Int. Cl.
  *G06F 9/46*    (2006.01)
  *G06F 9/50*    (2006.01)
(52) U.S. Cl.
  CPC ...... *G06F 9/5072* (2013.01); *G06F 2209/501* (2013.01); *G06F 2209/502* (2013.01)
(58) Field of Classification Search
  CPC ............. G06F 9/5072; G06F 2209/501; G06F 2209/502
  See application file for complete search history.

(56) References Cited

U.S. PATENT DOCUMENTS 10,372,490 B2 *   8/2019   Ferris ....................... G06F 9/50
2019/0149617 A1 *  5/2019   Gao ........................ H04L 67/34
                                                      709/223

FOREIGN PATENT DOCUMENTS

JP          2020-129184 A       8/2020

* cited by examiner

*Primary Examiner* — Diem K Cao
(74) *Attorney, Agent, or Firm* — MATTINGLY & MALUR, PC

(57) ABSTRACT

An environment construction system holds resource price information indicating a price of available resources in a second environment and communication distance information indicating a distance of a communication path between the second environment and a first environment when the available resources are used for the second environment, acquires system configuration information of an information system and environment arrangement information indicating a physical location where the first environment is disposed, analyzes the system configuration information to generate an analysis result indicating a configuration of the system, determines an environment arrangement policy indicating a requirement required for the second environment based on the analysis result, selects a resource to be used for the second environment based on the resource price information, the communication distance information, and the environment arrangement policy, converts the system configuration information to use the selected resource, and constructs the second environment using the selected resource.

9 Claims, 11 Drawing Sheets

FIG. 2

106 — SYSTEM CONSTRUCTION INFORMATION STORAGE UNIT

SYSTEM CONFIGURATION INFORMATION — 1061

| OPERATING ENVIRONMENT | VERIFICATION ENVIRONMENT 1 |
|---|---|
| SYSTEM DEFINITION ITEM 1: VALUE A<br>SYSTEM DEFINITION ITEM 2: VALUE B<br>SYSTEM DEFINITION ITEM 3: VALUE C<br>⋮ | SYSTEM DEFINITION ITEM 1: VALUE $\alpha 1$<br>SYSTEM DEFINITION ITEM 2: VALUE $\beta 1$<br>⋮ |
| | VERIFICATION ENVIRONMENT 2<br>SYSTEM DEFINITION ITEM 1: VALUE $\alpha 2$<br>SYSTEM DEFINITION ITEM 2: VALUE $\beta 2$<br>⋮ |

RESOURCE PRICE INFORMATION — 1062

| PROVISION AREA | PRICE |
|---|---|
| AREA A | $0.2/HOUR |
| AREA B | $0.08/HOUR |
| AREA C | $0.1/HOUR |
| ⋮ | ⋮ |

COMMUNICATION DISTANCE INFORMATION — 1063

| PROVISION AREA | RESPONSE TIME |
|---|---|
| AREA A | 0.03 SECONDS |
| AREA B | 0.1 SECONDS |
| AREA C | 0.05 SECONDS |
| ⋮ | ⋮ |

PROTECTION DATA INFORMATION — 1064

| USE DATABASE | NECESSITY OF PROTECTION |
|---|---|
| DATABASE Y | NECESSARY |
| DATABASE Z | UNNECESSARY |

ENVIRONMENT ARRANGEMENT INFORMATION — 1065

| ENVIRONMENT TYPE | ARRANGEMENT AREA |
|---|---|
| OPERATING ENVIRONMENT | AREA A |
| VERIFICATION ENVIRONMENT 1 | AREA B |
| VERIFICATION ENVIRONMENT 2 | AREA C |

USER DEFINITION INFORMATION — 1066

| ITEM | DEFINITION VALUE |
|---|---|
| RESOURCE PRICE | $0.15/HOUR OR LESS |
| RESPONSE TIME | WITHIN 0.1 SECONDS |
| DIVISION OF VERIFICATION ENVIRONMENT | PERMISSION |

FIG. 8

| ITEM NO. | TEST CONTENT | EXPECTED VALUE |
|---|---|---|
| #1 | TRANSACTION PERFORMANCE OF SERVICE X AND DATABASE X | 50,000 CASES/SEC OR MORE |
| #2 | TRANSACTION PERFORMANCE OF SERVICE Y AND DATABASE Y | 30,000 CASES/SEC OR MORE |
| #3 | COMMUNICATION THROUGHPUT IN SERVICE Y AND SERVICE Z | 3Mbps OR MORE |
| ... | ... | ... |

800

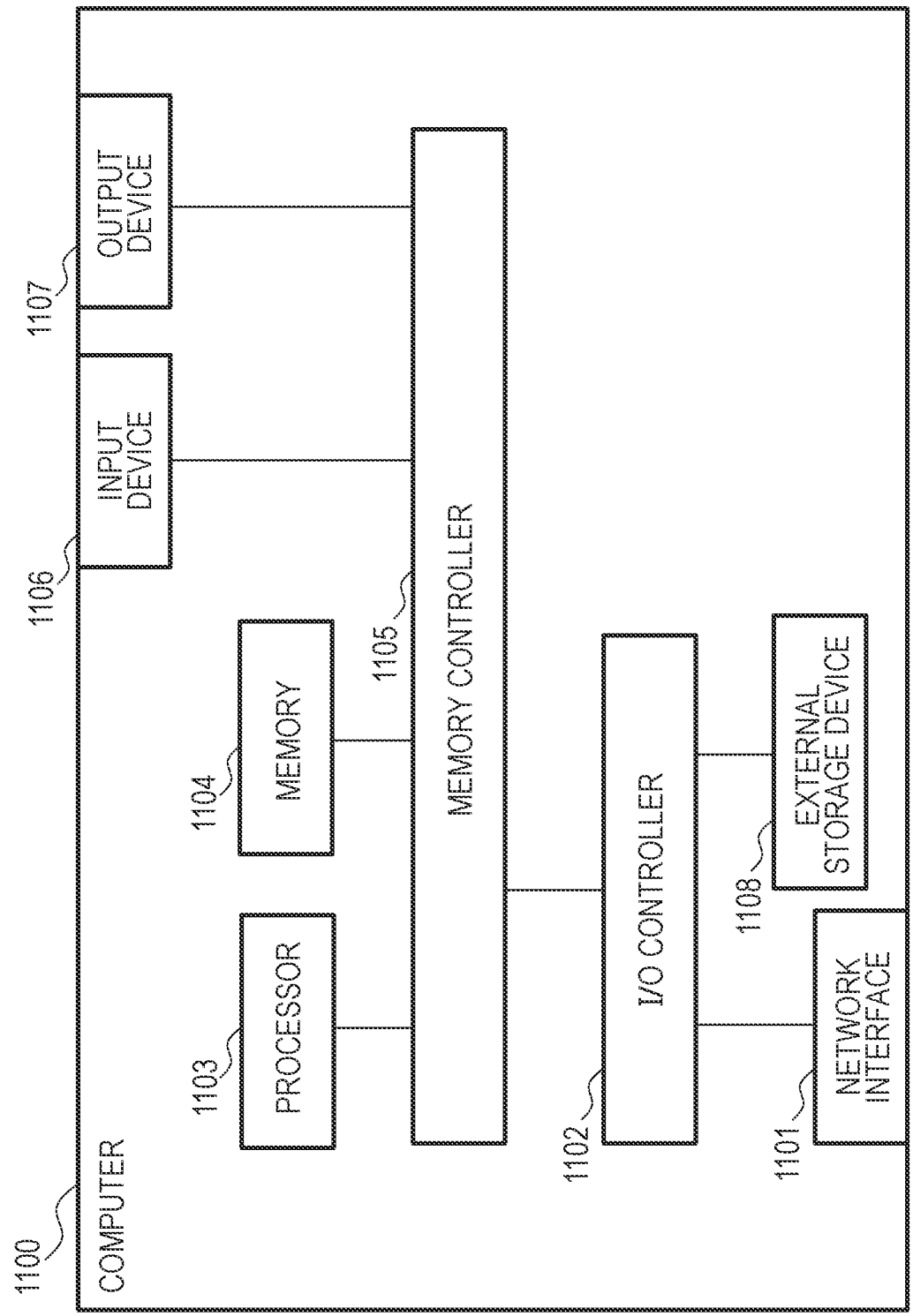

ENVIRONMENT CONSTRUCTION SYSTEM AND ENVIRONMENT CONSTRUCTION METHOD

CROSS-REFERENCE TO RELATED APPLICATION

The present application claims priority from Japanese application JP2021-201650, filed on Dec. 13, 2021, the contents of which is hereby incorporated by reference into this application.

BACKGROUND OF THE INVENTION

1. Field of the Invention

The present disclosure relates to a technique for constructing an environment of an information system.

2. Description of the Related Art

In a cloud service, information technology (IT) resources (hereinafter, resources) such as a server and a storage are provided via the Internet. Therefore, it is possible to freely construct a system or provide a service on the cloud using resources on the cloud. In the cloud service, functions such as server reinforcement and load distribution in system operation are also provided. Therefore, the system management cost and the operation burden can be greatly reduced as compared with the on-premises operation. From such a background, many companies use cloud computing as a user to provide their own services.

Meanwhile, resource virtualization technologies are also advanced and diversified. For example, there is a technology of a virtual server that logically divides a physical server into a plurality of servers and presents the plurality of physical servers as a plurality of servers. There is a technology of a container in which resources of a plurality of physical servers are shown as one server by logically dividing processing into processing units of an operating system (OS) operating on a server. With the progress and diversification of such virtualization technologies, an orchestration tool for efficiently managing and operating virtualized resources has been developed. In management of a cloud service, periodic update of an orchestration tool is also required in addition to update of the service itself. In order to continuously provide a service, a company providing a cloud service needs to cope with periodic update of an orchestration tool as described above in addition to update of the service itself.

In the work of upgrading such a provided service or orchestration tool, generally, the process proceeds in a flow of first constructing a verification environment for verifying that a service or tool after the upgrade is operated without a problem, then confirming that the service or tool after the upgrade is operated without a problem using the environment, and then applying the service or tool after the upgrade to a system currently operating (hereinafter, also referred to as a "working system").

It is desirable to verify the services and tools after the version upgrade using resources similar to the resources used in the environment in which the services and tools are actually operated. Therefore, when a service or a tool is provided on the cloud, an environment (hereinafter, also referred to as a "verification environment") used for verification of the service or the tool after version upgrade is generally constructed on the cloud. However, in order to use resources on the cloud, it is necessary to pay a usage fee to a cloud vendor. Therefore, it takes a lot of cost to permanently maintain the verification environment. Therefore, it is required that the verification environment can be dynamically constructed when it is necessary, and the verification environment can be constructed with resources as inexpensive as possible.

Regarding dynamic construction and inexpensive construction of a verification environment, a cloud vendor provides a service that allows a user to use unused resources (hereinafter, also referred to as "surplus resources") held by the cloud vendor at a low cost. However, since this service is a service that provides surplus resources at a low cost, there is a possibility that the use is forcibly terminated due to the convenience of the cloud vendor. Forced unavailability of a resource or the like used by a user due to circumstances of a cloud vendor may be hereinafter referred to as "forced termination". JP 2020-129184 A discloses a method for ensuring availability while suppressing an operation cost by using an instance that may be forcibly terminated in a cluster system.

SUMMARY OF THE INVENTION

An "instance that may be forcibly terminated" in JP 2020-129184 A corresponds to the above-described surplus resource. It is considered that the operation cost of the verification environment can be reduced by applying the method disclosed in JP 2020-129184 A to the construction of the verification environment. However, there are cases where various problems occur simply in constructing the verification environment using inexpensive surplus resources (hereinafter, also referred to as "inexpensive resources"). For example, there is a case where information in a database actually used in an environment (hereinafter, also referred to as an "operating environment") in which a system in operation is currently operated is used in a verification environment to verify a service or a tool after version upgrade. In such a case, communication is required between the operating environment and the verification environment to execute verification.

However, if an inexpensive resource is simply utilized for the verification environment, the resource may be provided by a server that is physically remote from the operating environment. This increases the distance of the communication path between the operating environment and the verification environment and increases the time required for data transfer, and thus may become a factor that hinders appropriate verification.

In a case where an inexpensive resource is simply used for the verification environment, there is a possibility that the resource is provided by a server in a country or region different from the operating environment. However, taking out information such as personal information to the outside of the country or the like may be regulated by a legal system. For example, there is a law called General Data Protection Regulation (GDPR) in Europe. The GDPR is a law to protect personal data leakage outside Europe. If data stored in a database of a system that provides services in an operating environment built in Europe includes data protected by this type of law (hereinafter, also referred to as "protection data"), the protection data cannot be used as it is outside Europe. In order to construct the verification environment outside Europe, it is necessary to anonymize the protection data or replace the protection data with dummy data and provide the protection data to the verification environment.

One object of the present disclosure is to provide a technology that enables construction of a suitable second environment in consideration of a system configuration of an information system, a price of a resource used for the second environment, and communication performance between a first environment and the second environment when the information system constructed in the first environment is reconstructed into the second environment.

An aspect of the present disclosure provides an environment construction system for reconstructing an information system constructed in a first environment into a second environment, the environment construction system including: a system construction information storage unit that holds, for an available resource that is a resource available for the second environment, resource price information indicating a price of the available resource and communication distance information indicating a distance of a communication path between the second environment and the first environment in a case where the available resource is used for the second environment; a system construction information acquisition unit that acquires system configuration information indicating a configuration of the information system and environment arrangement information indicating a physical location where the first environment is disposed; a system configuration information analysis unit that analyzes the system configuration information to generate an analysis result indicating a configuration of the system; an environment arrangement determination unit that determines an environment arrangement policy indicating a requirement required for the second environment based on the analysis result; a resource selection unit that selects a resource to be used for the second environment from among the available resources based on the resource price information, the communication distance information, and the environment arrangement policy; a system configuration information conversion unit that converts the system configuration information to use the selected resource; and a system construction unit that constructs the second environment using the selected resource and constructs the information system in the second environment.

According to the present invention, it is possible to optimize the resource use cost and the communication distance according to the information of the system of the operating environment, and to dynamically construct the verification environment corresponding to the legal system related to data protection.

BRIEF DESCRIPTION OF THE DRAWINGS

FIG. 2 is a diagram illustrating a specific example of information in a system construction information storage unit according to the first embodiment;

FIG. 8 is a diagram illustrating a specific example of a test case list indicating verification items in the second embodiment;

FIG. 11 is a diagram illustrating a hardware configuration example of a computer that implements the environment construction system according to the present disclosure.

DESCRIPTION OF THE PREFERRED EMBODIMENTS

Figure 1:
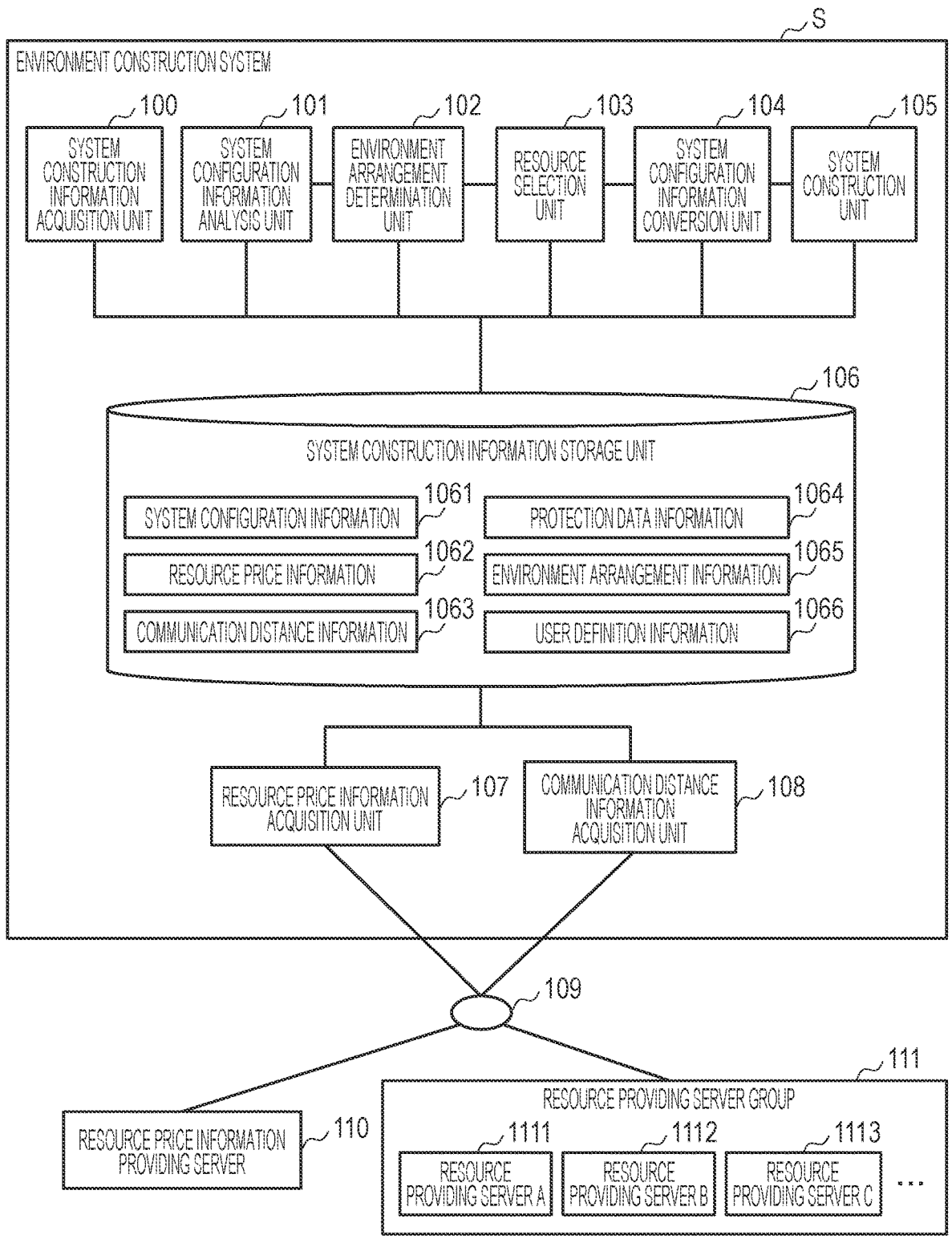
FIG. 1 is a diagram illustrating an exemplary functional configuration of an environment construction system according to a first embodiment.

Hereinafter, embodiments will be described using the drawings. Note that the following description is merely an example of implementation, and the invention is not intended to be limited to the following description. In the following description, the same or similar elements and processing are denoted by the same reference numerals, and redundant description is omitted. In the following embodiments, differences from the above-described embodiments will be described, and redundant description may be omitted. The following description of the embodiment and the configuration and processing illustrated in each drawing illustrate the outline of the embodiment to the extent necessary for understanding and carrying out the present invention, and are not intended to limit the embodiment according to the present invention. Some or all of the embodiments and modifications can be combined without departing from the gist of the present invention within a range consistent with each other.

First Embodiment

In the present embodiment, a process of optimizing a resource use cost and a communication distance according to information of a system of an operating environment and dynamically constructing a verification environment corresponding to a legal system related to data protection will be described.

First, a configuration example of functions of an environment construction system S according to the present embodiment will be described with reference to FIG. 1. FIG. 1 is a diagram illustrating a configuration example of functions of the environment construction system S according to a first embodiment.

The environment construction system S is a system for reconstructing the information system constructed in a first environment into a second environment. In the present embodiment, an example in which the first environment is an "operating environment" and the second environment is a "verification environment" will be described, but the first environment and the second environment are not limited thereto.

As illustrated in FIG. 1, the environment construction system S includes a system construction information acquisition unit 100, a system configuration information analysis unit 101, an environment arrangement determination unit 102, a resource selection unit 103, a system configuration information conversion unit 104, a system construction unit 105, a system construction information storage unit 106, a resource price information acquisition unit 107, and a communication distance information acquisition unit 108.

The system construction information storage unit 106 holds system configuration information 1061, resource price information 1062, communication distance information 1063, protection data information 1064, environment arrangement information 1065, and user definition information 1066.

The environment construction system S may acquire the resource price information 1062 from a resource price information providing server 110 via a network 109. The resource price information 1062 indicates the price of the available resource for the available resource that is the resource available for the second environment.

The environment construction system S may acquire the communication distance information 1063 from a resource providing server group 111 via the network 109. The communication distance information 1063 indicates the distance of a communication path between the second environment and the second environment when the available resource is used for the second environment.

The network 109, the resource price information providing server 110, and the resource providing server group 111 may be collectively referred to as a cooperation unit.

Next, information registration in the system construction information storage unit 106 by the system construction information acquisition unit 100 will be described. The system construction information acquisition unit 100 acquires information input from a user who uses the environment construction system S, and acquires information from a construction server on which a system in an operating environment is constructed. For example, the system construction information acquisition unit 100 acquires the system configuration information 1061, the protection data information 1064, the environment arrangement information 1065, and the user definition information 1066.

Here, an example of each piece of information in the present embodiment will be described with reference to FIG. 2. FIG. 2 is a diagram illustrating an example of information stored in the system construction information storage unit 106 according to the first embodiment.

First, the system configuration information 1061 will be described. The system configuration information 1061 is information indicating a configuration of an information system, and is information used when a system is automatically constructed by an orchestration tool or the like. For example, the system configuration information 1061 includes system definition items and setting values thereof. The system definition item specifies a resource to be used, and includes a container, a storage, a network, and the like. In the case of a container, a name of the container, an image to be used, a port number, and the like are described as the setting value. By hierarchically describing each piece of information, arrangement information, a connection relationship, and the like of each resource can be described. By reading and executing the system configuration information 1061 by an orchestration tool or the like, a system can be constructed in an arbitrary place. Examples of the system configuration information 1061 include manifest of Kubernetes (Kubernetes is a trademark or registered trademark of The Linux Foundation in the United States and other countries.), Docker-compose of Docker (Docker is a trademark or registered trademark of Docker, Inc. in the United States and other countries.), and the like.

Although FIG. 2 illustrates an example in which the system construction information storage unit 106 stores the system configuration information 1061 of the system of the operating environment (first environment) and the system configuration information 1061 of the system to be constructed in the verification environment (second environment), the information acquired by the system construction information acquisition unit 100 may be the system configuration information 1061 of the system of the operating environment.

The system construction information acquisition unit 100 may acquire the system configuration information 1061 of the system in the operating environment from the user who uses the environment construction system S or from the construction server on which the system in the operating environment is constructed.

Next, the protection data information 1064 will be described. The protection data information 1064 indicates whether data used by the information system constructed in the operating environment (first environment) can be used in the verification environment (second environment). For example, the protection data information 1064 is information indicating the necessity of protection under the legal system of information held in a database used by the system in the operating environment. The protection data information 1064 may be acquired from a user who grasps the use data, such as a management user of the system of the operating environment.

Next, the environment arrangement information 1065 will be described. The environment arrangement information 1065 indicates a physical location where the first environment (or the second environment) is disposed. That is, the environment arrangement information 1065 is area information indicating an area in which the operating environment and the verification environment are disposed. The area is a place where a cloud vendor installs a data center for providing resources, and a major cloud vendor installs the data center in each country of the world.

What the system construction information acquisition unit 100 acquires may be the environment arrangement information 1065 of the operating environment. The system construction information acquisition unit 100 may acquire the environment arrangement information 1065 of the operating environment from the user who uses the environment construction system S or from the construction server on which the system of the operating environment is constructed.

Next, the user definition information 1066 will be described. The user definition information 1066 is information related to a user requirement considered when selecting a resource to be used in constructing the verification environment. FIG. 2 illustrates an example in which the user definition information 1066 holds a constraint on a price of a resource to be used, a constraint on a response time related to a network delay assuming a case of performing communication between the operating environment and the verification environment, and a constraint on division and construction of the verification environment. The user definition information 1066 is acquired from a user who uses the environment construction system S.

Next, determination of an arrangement policy of verification environment by the system configuration information analysis unit 101 and the environment arrangement determination unit 102 will be described.

The system configuration information analysis unit 101 acquires and analyzes the system configuration information 1061 of the operating environment from the system construction information storage unit 106, and generates an analysis result indicating the configuration of the system. The system configuration information analysis unit 101 obtains arrangement information of the container, presence or absence of the database, a connection relationship between each container and the database, and the like as analysis results.

Figure 3:
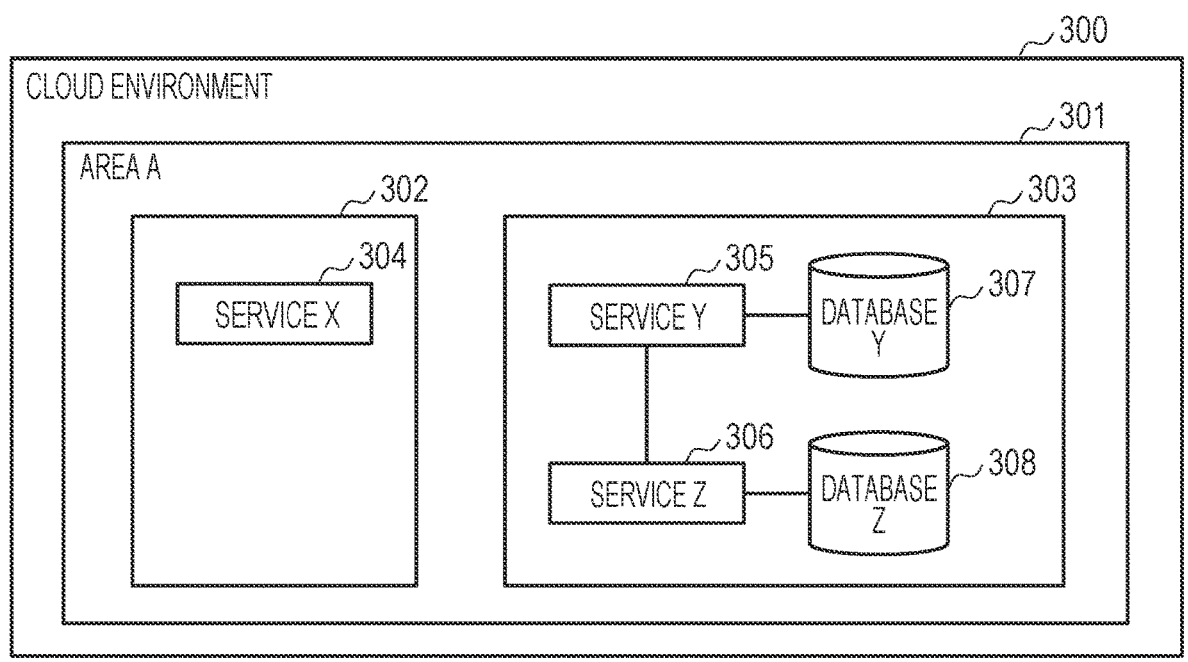
FIG. 3 is a diagram illustrating a specific example of a system in an operating environment according to the first embodiment.

Here, an example of an analysis result of the system configuration information 1061 according to the present embodiment will be described with reference to FIG. 3. FIG. 3 visually illustrates an analysis result of the system configuration information 1061, and is a diagram illustrating an example of an operating environment system according to the first embodiment.

The system in the operating environment is built on a cloud environment 300, and is built using the resources provided by an area A301, which is one of the areas owned by the cloud vendor.

The system in the operating environment includes service execution units 302 and 303. The "service execution unit" is an aggregate of resources that realize a specific service. The service execution unit 302 is configured by a service X304 alone. The service execution unit 303 includes a service Y305 and a service 2306, and a database Y307 and a database 2308. Each resource in the service execution unit realizes a specific service by sharing a network and a storage with each other. That is, the system in the operating environment illustrated in FIG. 3 provides two services independent from each other by the service execution units 302 and 303.

The environment arrangement determination unit 102 determines an environment arrangement policy indicating a requirement required for the verification environment (second environment) on the basis of the analysis result of the system configuration information analysis unit 101. An example of the environment arrangement policy of the verification environment includes a method of dividing and constructing the verification environment in units of service execution. For example, since the service execution unit 302 operates by the service X304 alone and does not need to communicate with the operating environment in verification, resource selection that prioritizes resource price reduction over a communication distance with the operating environment is effective. On the other hand, the service execution unit 303 is a service using a database, and it is assumed that information of the database of the operating environment is used in the verification. Therefore, in consideration of a network delay in communication with the operating environment, resource selection in which a communication distance with the operating environment is prioritized over a resource price is effective. In a system in which services in which resource selection is more effective from different viewpoints are mixed, it can be determined that it is effective to divide and construct the verification environment in units of service execution.

Depending on the verification content, there is a possibility of verifying communication between two services provided by the service execution unit 302 and the service execution unit 303. In such a case, the user constructing the verification environment does not want to divide the verification environment. In this case, the environment arrangement determination unit 102 refers to the user definition information 1066 held in the system construction information storage unit 106, confirms constraints of division construction of the verification environment described as user requirements, and then determines a final arrangement policy. As a result, it is possible to prevent construction of the verification environment against the user's intention.

Next, the resource price information acquisition unit 107 and the communication distance information acquisition unit 108 that acquire information necessary for selecting a resource to be used in the verification environment from an external network will be described.

First, the resource price information acquisition unit 107 will be described. The resource price information acquisition unit 107 acquires the resource price information 1062 from the provider of the available resource and stores the resource price information in the system construction information storage unit 106. Accordingly, the resource price information acquisition unit 107 can easily acquire the resource price information 1062. For example, the resource price information acquisition unit 107 is connected to the resource price information providing server 110 via the network 109. The resource price information providing server 110 is an information providing server of a cloud vendor, and discloses a resource price for each area in which the cloud vendor provides a service. The resource price information acquisition unit 107 acquires the information on the resource price from the resource price information providing server 110, and stores the information as the resource price information 1062 in the system construction information storage unit 106. As illustrated in FIG. 2, for example, the resource price information 1062 includes information indicating a resource use price per hour for each area in which a cloud vendor provides a service.

Next, the communication distance information acquisition unit 108 will be described. The communication distance information acquisition unit 108 acquires the communication distance information 1063 and stores the acquired communication distance information in the system construction information storage unit 106. Accordingly, the communication distance information acquisition unit 108 can easily acquire the communication distance information 1063. For example, the communication distance information acquisition unit 108 is connected to the resource providing server group 111 via the network 109. The resource providing server group 111 includes resource providing servers installed in areas in which a cloud vendor provides services. Here, a resource providing server A1111 represents a server that provides resources in an area A, a resource providing server B1112 represents a server that provides resources in an area B, and a resource providing server C1111 represents a server that provides resources in an area C.

The communication distance information acquisition unit 108 measures the communication distance between the operating environment and each area, and stores the measurement result in the system construction information storage unit 106 as the communication distance information 1063. An example of the measurement method is measurement based on a response time. For example, the communication distance information acquisition unit 108 transmits an HTTP request from the operating environment to the resource providing server installed in each area, measures the time until the response is returned, and acquires the response time thus obtained as the communication distance information.

In the present embodiment, it is assumed that the environment construction system S is constructed in the same area as the operating environment, and a configuration is illustrated in which the communication distance information 1063 between the operating environment and each area is obtained by measuring the communication distance between the environment construction system S and each area. If the environment construction system S is arranged in an area different from the operating environment, the communication distance information acquisition unit 108 may be disposed in the area in which the operating environment is disposed, and the response time obtained therefrom may be stored in the system construction information storage unit 106 as the communication distance information 1063. For example, as illustrated in FIG. 2, the communication distance information 1063 includes information indicating a response time to a resource providing server installed in each area for each area in which a cloud vendor provides a service.

Next, a method of constructing a verification environment by the resource selection unit 103, the system configuration information conversion unit 104, and the system construction unit 105 will be described.

The resource selection unit 103 selects a resource to be used for the verification environment (second environment) from among the available resources on the basis of the resource price information 1062, the communication distance information 1063, and the above-described environment arrangement policy stored in the system construction information storage unit 106. The resource selection unit 103 may select a resource to be used for the verification environment by further using the user definition information 1066.

For example, it is assumed that the analysis result by the system configuration information analysis unit 101 indicates that the system in the operating environment has the configuration illustrated in FIG. 3. It is assumed that the user definition information 1066 permits division and construction of the verification environment as the user requirement regarding the verification environment. In this case, focusing on the system of the operating environment, as described above, the resource selection prioritizing the resource price reduction is effective for the service execution unit 302, and the resource selection prioritizing the communication distance with the operating environment is effective for the service execution unit 303. Therefore, the resource selection unit 103 selects an optimal resource provision area based on the resource price information 1062 and the communication distance information 1063 for each service execution unit. In this case, the resource selection unit 103 selects a resource so as to satisfy the user requirement regarding the resource price and/or the response time included in the user definition information 1066. The resource selection unit 103 registers the information of the selected resource provision area in the environment arrangement information 1065 of the system construction information storage unit 106. For example, the environment arrangement information 1065 illustrated in FIG. 2 illustrates a case where two verification environments are constructed for each service execution unit, and illustrates a case where the area B is selected as a verification environment 1 and an area C is selected as a verification environment 2.

Next, the system configuration information conversion unit 104 will be described. The system configuration information conversion unit 104 acquires the system configuration information 1061 stored in the system construction information storage unit 106, and changes the system configuration information 1061 according to the system configuration to be constructed in the verification environment. For example, as described above, when two verification environments are constructed for each service execution unit, the system configuration information conversion unit 104 generates two pieces of system configuration information 1061 in order to construct the respective verification environments. At this time, the system configuration information conversion unit 104 may separate the description of the system configuration described in the system configuration information 1061 at the interface of the service execution units to generate two pieces of system configuration information 1061.

At this time, the system configuration information conversion unit 104 may change the designation of the use resource described in the system configuration information 1061. For example, in a case where the system in the operating environment uses a permanently available on-demand provision resource, the system configuration information 1061 may specify the use of the on-demand resource. Therefore, the system configuration information conversion unit 104 changes the use of the on-demand resource to the use of the inexpensive resource selected by the resource selection unit 103.

The system configuration information conversion unit 104 reflects the difference between the system in the operating environment and the system in the verification environment, that is, an update difference serving as the verification item, in the system configuration information 1061. For example, in a case where the system configuration information conversion unit 104 updates the container operating on the system and constructs the verification environment to verify the operation, the system configuration information conversion unit 104 changes the container image specified in the system configuration information 1061 to an updated version.

The system configuration information conversion unit 104 stores the system configuration information 1061 generated in this manner in the system construction information storage unit 106. For example, as illustrated in FIG. 2, it is assumed that two verification environments are constructed for each service execution unit as the verification environment 1 and the verification environment 2, and the system configuration information 1061 may include configuration information of a system for constructing each environment.

Next, the system construction unit 105 will be described. The system construction unit 105 constructs a verification environment (second environment) using the selected resources, and constructs an information system in the verification environment. For example, the system construction unit 105 acquires the system configuration information 1061, the protection data information 1064, and the environment arrangement information 1065 from the system construction information storage unit 106, and constructs an information system in the verification environment on the basis of these pieces of information. For example, the system construction unit 105 obtains system configuration information necessary for constructing the verification environment from the system configuration information 1061. For example, two pieces of system configuration information for verification environment construction are stored in the system configuration information 1061 illustrated in FIG. 2, and the area of the construction destination of each system can be confirmed by referring to the environment arrangement information 1065. Therefore, the system construction unit 105 can automatically construct each verification environment for the area described in the environment arrangement information 1065 by giving the system configuration information 1061 to the orchestration tool or the like.

When the system in the operating environment uses the database, it is possible to confirm the necessity of protection in the legal system with respect to the information held by each database by referring to the protection data information 1064, and thus, it is also possible to anonymize the information that needs to be protected. The anonymization processing may be implemented by any method, and examples thereof include a method of rewriting the value of each field on the database to another value. For example, in a case where the value of an arbitrary field is a character string "ABC", a process of rewriting all characters to "X" is performed to convert the character string to a character string "XXX", and the character string is used as the value of a new field, whereby anonymization can be performed.

According to the configuration of the environment construction system S described above, when the information system constructed in the operating environment (first environment) is reconstructed into the verification environment (second environment), it is possible to construct a suitable second environment in consideration of the system configuration of the information system, the price of the resource used for the second environment, and the communication performance between the first environment and the second environment.

Next, an example of system construction in the verification environment using the environment construction system S according to the present embodiment will be described with reference to FIGS. 4 and 5.

Figure 4:
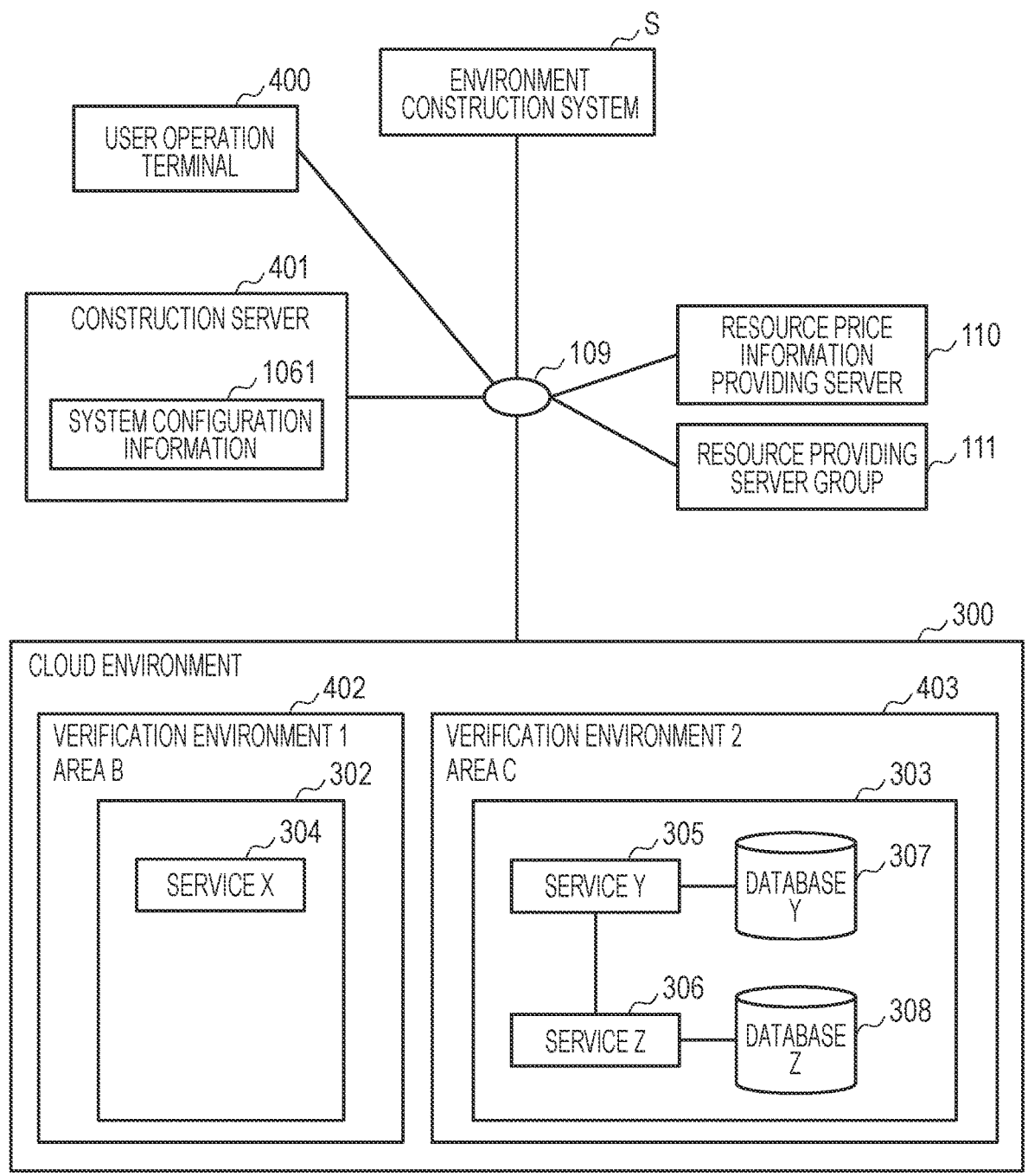
FIG. 4 is a diagram illustrating an example of system construction in a verification environment in the first embodiment.

FIG. 4 is a diagram illustrating an example of system construction in a verification environment according to the first embodiment. The environment construction system S, the network 109, the resource price information providing server 110, and the resource providing server group 111 are the same as those illustrated in FIG. 1. The configuration of the verification environment constructed by the following description is described on the cloud environment 300.

Figure 5:
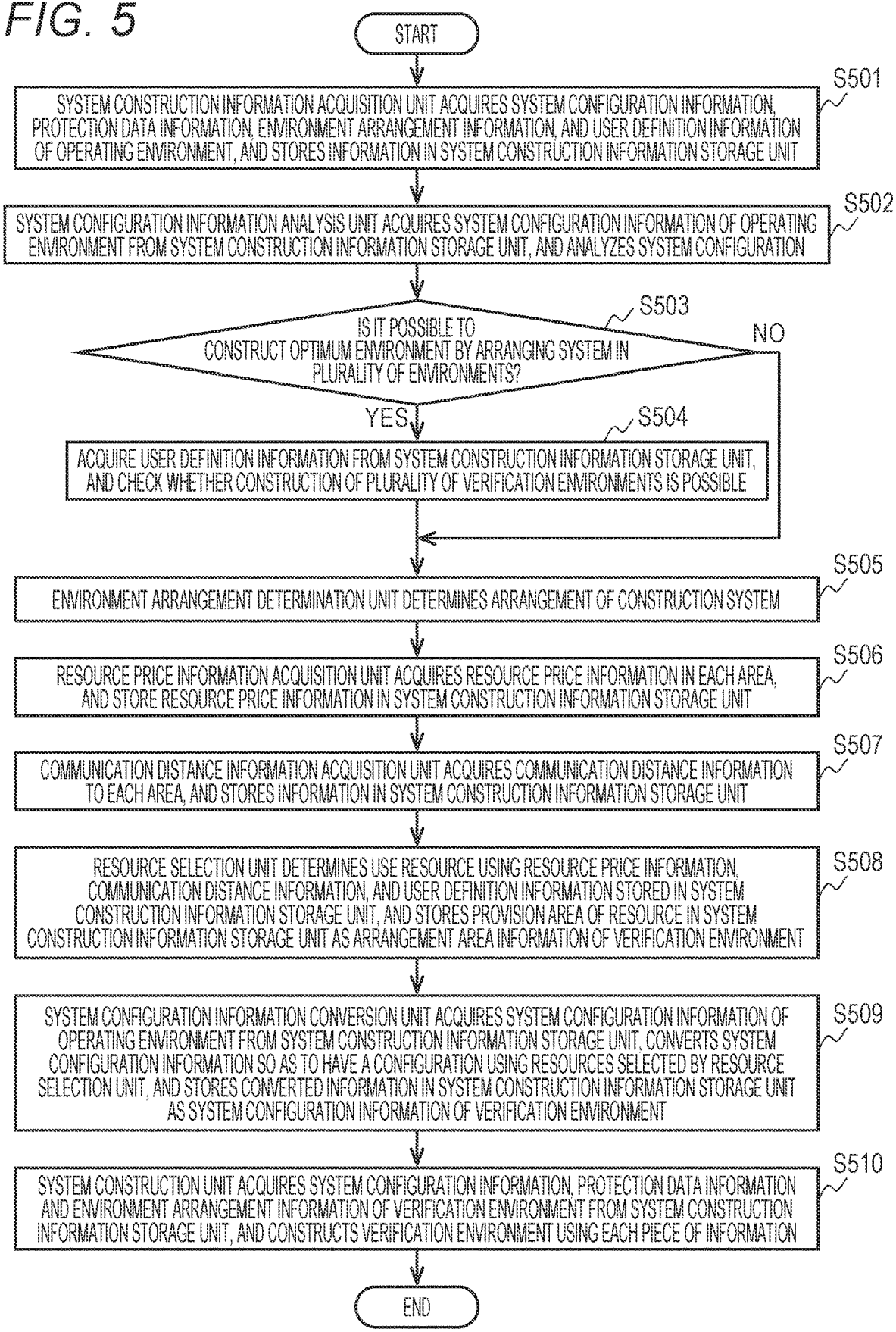
FIG. 5 is an example of a flowchart illustrating a flow of system construction processing to the verification environment in the first embodiment.

FIG. 5 is an example of a flowchart illustrating a flow of system construction processing to the verification environment in the first embodiment. Next, system construction processing for a verification environment using the environment construction system S will be described with reference to FIG. 5.

First, the system construction information acquisition unit 100 acquires the system configuration information 1061, the protection data information 1064, the environment arrangement information 1065, and the user definition information 1066 of the operating environment, and stores them in the system construction information storage unit 106 (S501).

The system configuration information 1061 and the environment arrangement information 1065 may be input to a user operation terminal 400 by the user who uses the environment construction system S. For example, the system construction information acquisition unit 100 acquires the system configuration information 1061 and the environment arrangement information 1065 transmitted from the user operation terminal 400 to the environment construction system S via the network 109. The user operation terminal 400 is, for example, a personal computer (PC) or a tablet terminal, and has a function of receiving input of information from the user and a function of presenting (outputting) information acquired from the outside of the terminal to the user.

The system configuration information 1061 may be used to construct a system in an operating environment in a construction server 401. For example, the system construction information acquisition unit 100 acquires the system configuration information 1061 transmitted from the construction server 401 to the environment construction system S via the network 109.

The protection data information 1064 may be input to the user operation terminal 400 by a management user or the like of the system in the operating environment or a user who grasps the use data. For example, the system construction information acquisition unit 100 acquires the protection data information 1064 transmitted from the user operation terminal 400 to the environment construction system S via the network 109.

The user definition information 1066 may be input to the user operation terminal 400 by the user who uses the environment construction system S. For example, the system construction information acquisition unit 100 acquires the user definition information 1066 transmitted from the user operation terminal 400 to the environment construction system S via the network 109.

Next, the system configuration information analysis unit 101 acquires the system configuration information 1061 of the operating environment from the system construction information storage unit 106, and analyzes the system configuration (S502).

The environment arrangement determination unit 102 determines whether an optimal environment can be constructed by disposing the system in a plurality of environments on the basis of the analysis result of S502 (S503). For example, when the analysis result of the system configuration of the operating environment in S502 indicates the system configuration as illustrated in FIG. 3, the environment arrangement determination unit 102 determines that it is better to construct different verification environments for the service execution unit 302 in which resource selection prioritizing resource price reduction is valid and the service execution unit 303 in which resource selection prioritizing a communication distance with the operating environment is valid.

In a case where it is determined that it is better to construct a different verification environment (S503: YES), the environment arrangement determination unit 102 acquires the user definition information 1066 from the system construction information storage unit 106, and checks whether first constraint information indicating a constraint condition on the number of verification environments (second environments) to be constructed is described in the user definition information 1066. That is, the environment arrangement determination unit 102 confirms whether construction of a plurality of verification environments is permitted in the user definition information 1066 (S504). When construction of a plurality of verification environments is permitted, the environment arrangement determination unit 102 determines an arrangement policy so as to construct a plurality of verification environments (S505). As a result, it is possible to construct the verification environment (second environment) so as to satisfy the condition defined by the user for dividing the verification environment (second environment) into a plurality of environments.

In a case where the construction of a plurality of verification environments is not permitted or there is no need to construct different verification environments (S503: NO), the environment arrangement determination unit 102 determines an arrangement policy so as to construct a single verification environment (S505).

Next, the resource price information acquisition unit 107 acquires the resource price information 1062 in each area in which the cloud vendor provides a service, and stores the information in the system construction information storage unit 106 (S506).

Next, the communication distance information acquisition unit 108 acquires communication distance information 1063 to each area, and stores the acquired information in system construction information storage unit 106 (S507).

Next, the resource selection unit 103 acquires the resource price information 1062, the communication distance information 1063, and the user definition information 1066 from the system construction information storage unit 106, selects an optimum use resource on the basis of each information, and stores the provision area of the resource in the environment arrangement information 1065 of the system construction information storage unit 106 as arrangement area information of the verification environment (S508).

Here, a case where it is determined in Step S503 that it is better to construct different verification environments and the construction of a plurality of verification environments is permitted in Step S504 will be described. The description will be given on the assumption that the resource price information 1062, the communication distance information 1063, and the user definition information 1066 are those illustrated in FIG. 2. As illustrated in FIG. 2, second constraint information indicating a constraint condition on the price of the resource to be used in the verification environment (second environment) is described in the user definition information 1066. In the user definition information 1066, third constraint information indicating a constraint condition on the distance of the communication path between the operating environment (first environment) and the verification environment (second environment) is written.

As determined in Step S503, the resource selection unit 103 constructs the verification environment 1 by performing resource selection prioritizing resource price reduction for the service execution unit 302, and constructs the verification environment 2 by performing resource selection prioritizing a communication distance with the operating environment for the service execution unit 303.

The resource selection unit 103 selects a resource to be used for the verification environment (second environment) so as to satisfy the constraint condition indicated by the second constraint information and the constraint condition indicated by the third constraint information described in the user definition information 1066. For example, the resource selection unit 103 selects a resource such that the resource price is "$0.15/hour or less" and the response time is "within 0.1 seconds" on the basis of the user definition information 1066 illustrated in FIG. 2. As a result, the verification environment (second environment) can be constructed so as to satisfy the condition defined by the user for the price of the resource of the verification environment (second environment). The verification environment (second environment) can be constructed so as to satisfy a condition defined by the user for the distance of the communication path to the operating environment (first environment) of the verification environment (second environment).

First, for the service execution unit 302, in order to review resource price reduction, the resource selection unit 103 refers to the resource price information 1062 and selects an area in which the least expensive resource is provided as an arrangement destination of the verification environment. Referring to the resource price information 1062, it can be seen that the lowest price resource is provided in the area B, which is $0.08/hour. Referring to the communication distance information 1063, it can be seen that the response time of the area B is 0.1 seconds. Since both satisfy the user requirements described in the user definition information 1066, the resource selection unit 103 selects the area B as the construction area of the verification environment 1.

Next, for the service execution unit 303, in order to review the communication distance to the operating environment, the resource selection unit 103 refers to the communication distance information 1063 and selects an area in which a resource having the shortest communication distance is provided as the arrangement destination of the verification environment. Referring to the communication distance information 1063, it can be seen that the area A provides the resource with the shortest communication distance in 0.03 seconds. However, referring to the resource price information 1062, it can be seen that the resource price of the area A is $0.2/hour, which does not satisfy the user requirement described in the user definition information 1066. Therefore, when an area providing a resource with a short communication distance is selected next, it can be seen that the distance is 0.05 seconds in the area C. Referring to the resource price information 1062, the resource price of the area C is $0.1/hour, and both satisfy the user requirements described in the user definition information 1066. Therefore, the resource selection unit 103 selects the area C as the construction area of the verification environment 2.

The resource selection unit 103 stores the arrangement area information of the verification environment for the area selected in this manner in the system construction information storage unit 106 as the environment arrangement information 1065.

Next, the system configuration information conversion unit 104 acquires the system configuration information 1061 of the operating environment from the system construction information storage unit 106, converts the system configuration information 1061 so as to have a configuration using the resources selected by the resource selection unit 103, and stores the converted information in the system construction information storage unit as the system configuration information 1061 of the verification environment (S509).

In the present embodiment, it is determined that the verification environment 1 prioritizing the resource price reduction is constructed for the service execution unit 302, and the verification environment 2 prioritizing the communication distance with the operating environment is constructed for the service execution unit 303.

Therefore, the system configuration information conversion unit 104 separates the description of the system configuration information 1061 of the operating environment at the interface of the service execution unit, and generates the system configuration information 1061 for constructing the verification environment 1 and the system configuration information 1061 for constructing the verification environment 2.

Further, the system configuration information conversion unit 104 rewrites the system configuration information 1061 so as to use the inexpensive resources selected by the resource selection unit 103. Then, the system configuration information conversion unit 104 reflects the difference between the system in the operating environment and the system in the verification environment, that is, the update difference serving as the verification item, in the system configuration information 1061. The system configuration information conversion unit 104 stores the system configuration information 1061 generated in this manner in the system construction information storage unit 106.

Next, the system construction unit 105 acquires the system configuration information 1061, the protection data information 1064, and the environment arrangement information 1065 of the verification environment from the system construction information storage unit 106, and constructs the verification environment using each piece of information (S510).

For example, the system construction unit 105 acquires, as the system configuration information 1061, the system configuration information 1061 for constructing the verification environment 1 and the system configuration information 1061 for constructing the verification environment 2.

Further, the system construction unit 105 refers to the environment arrangement information 1065 and confirms the area in which each verification environment is constructed. The system construction unit 105 gives the acquired system configuration information 1061 to an orchestration tool or the like, and automatically constructs each verification environment in a designated area.

The system construction unit 105 converts data for which the protection data information 1064 cannot be used in the verification environment (second environment) so as to conceal a portion requiring protection. For example, the system construction unit 105 refers to the protection data information 1064 and confirms the necessity of protection under the legal system for the held information of the database used by the system in the operating environment. In a case where the system construction unit 105 has data that needs to be protected, the system construction unit 105 performs anonymization of the data before the data is used in the verification environment. As a result, from the viewpoint of protection of personal information and the like, even in a case where data of the operating environment (first environment) cannot be used as it is in the verification environment (second environment), it is possible to use the data by concealing necessary portions. That is, a verification environment compatible with the legal system can be constructed.

According to the present embodiment, it is possible to optimize the resource use cost and the communication distance according to the information of the system of the operating environment, and to dynamically construct the verification environment corresponding to the legal system related to data protection.

Second Embodiment

In the present embodiment, a process of optimizing resource use cost and a communication distance by considering test content performed in a verification environment in addition to information of a system in an operating environment and dynamically constructing a verification environment corresponding to a legal system related to data protection will be described.

Figure 6:
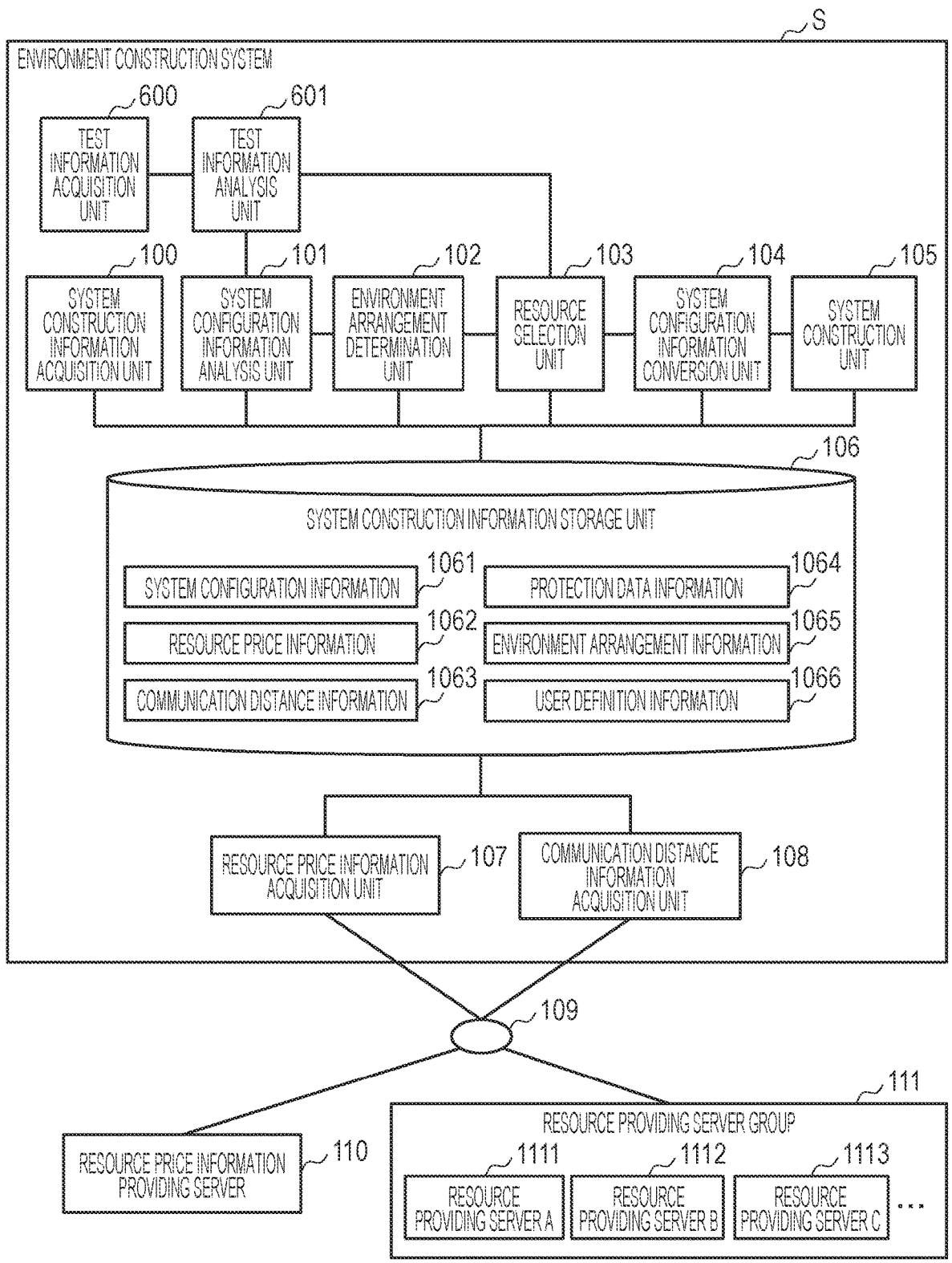
FIG. 6 is a diagram illustrating an exemplary functional configuration of an environment construction system according to a second embodiment.

First, an exemplary functional configuration of the environment construction system S according to the present embodiment will be described with reference to FIG. 6. FIG. 6 is a diagram illustrating an exemplary functional configuration of the environment construction system according to the second embodiment.

The configuration example of the functions of the environment construction system S in the second embodiment illustrated in FIG. 6 is different from that in FIG. 1 in the first embodiment in that the configuration example includes a test information acquisition unit 600 and a test information analysis unit 601, and the other configurations are the same.

In the first embodiment, the configuration in which the resource of the verification environment is selected on the basis of the system configuration information 1061 of the operating environment has been described. However, in the second embodiment, the resource of the verification environment is selected in consideration of the test content performed in the verification environment in addition to the system configuration information 1061 of the operating environment.

The test information acquisition unit 600 acquires test case information 800 (see FIG. 8) defining the content of a test for verifying the performance of the information system and an expected value representing the performance expected in the test.

The test information analysis unit 601 analyzes the test case information 800 and generates an analysis result indicating the content of the test and the expected value.

The resource selection unit 103 selects a resource to be used for the verification environment (second environment) so that an expected value can be obtained when the test indicated in the analysis result by the test information analysis unit 601 is performed on the information system of the verification environment (second environment).

According to the configuration of the environment construction system S described above, it is possible to select resources in consideration of the content of the test and the expected value. The details will be described below.

Figure 7:
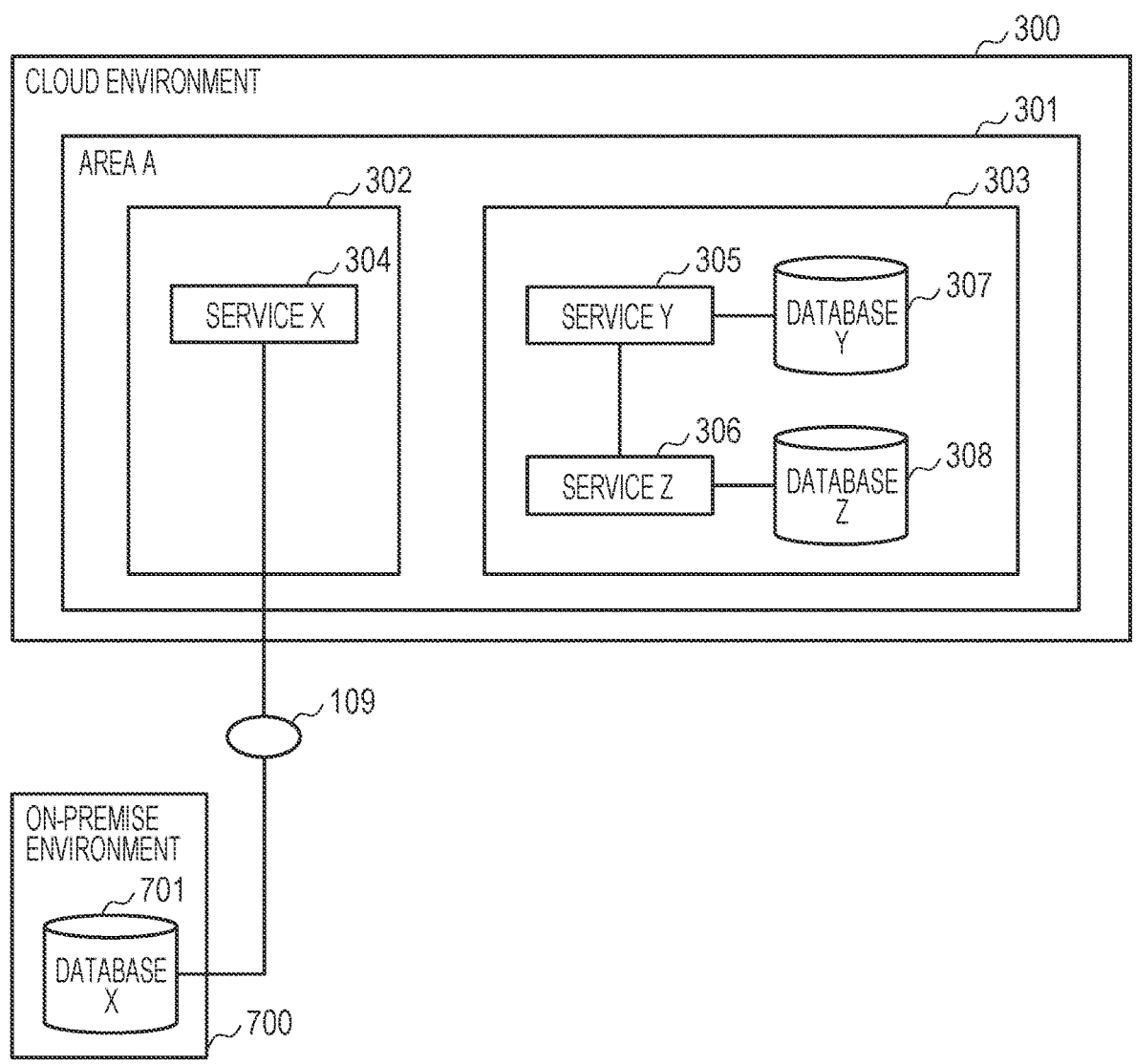
FIG. 7 is a diagram illustrating a specific example of a system in an operating environment according to the second embodiment.

A system configuration of an operating environment handled in the present embodiment will be described with reference to FIG. 7. FIG. 7 is a diagram illustrating an example of a system in an operating environment according to the second embodiment.

The system in the operating environment in the second embodiment illustrated in FIG. 7 is different from that in FIG. 3 in the first embodiment in that the service X304 is configured to communicate with a database X701 installed in an on-premises environment 700 via the network 109, and others are the same.

Next, test contents assumed to be implemented in a verification environment in the present embodiment will be described with reference to FIG. 8. FIG. 8 is a diagram illustrating an example of the test case information 800 indicating verification items in the second embodiment.

FIG. 8 illustrates three test cases as the test cases included in the test case information 800.

Test cases #1 and #2 indicate verification items of transaction performance between a specific service and a database, and Test case #3 indicates a verification item of throughput performance between specific services. Expected values in the respective test cases are described, and satisfaction of the expected values serves as acceptance criteria in verification.

Next, an example of system construction in the verification environment using the environment construction system S according to the present embodiment will be described with reference to FIGS. 9 and 10.

Figure 9:
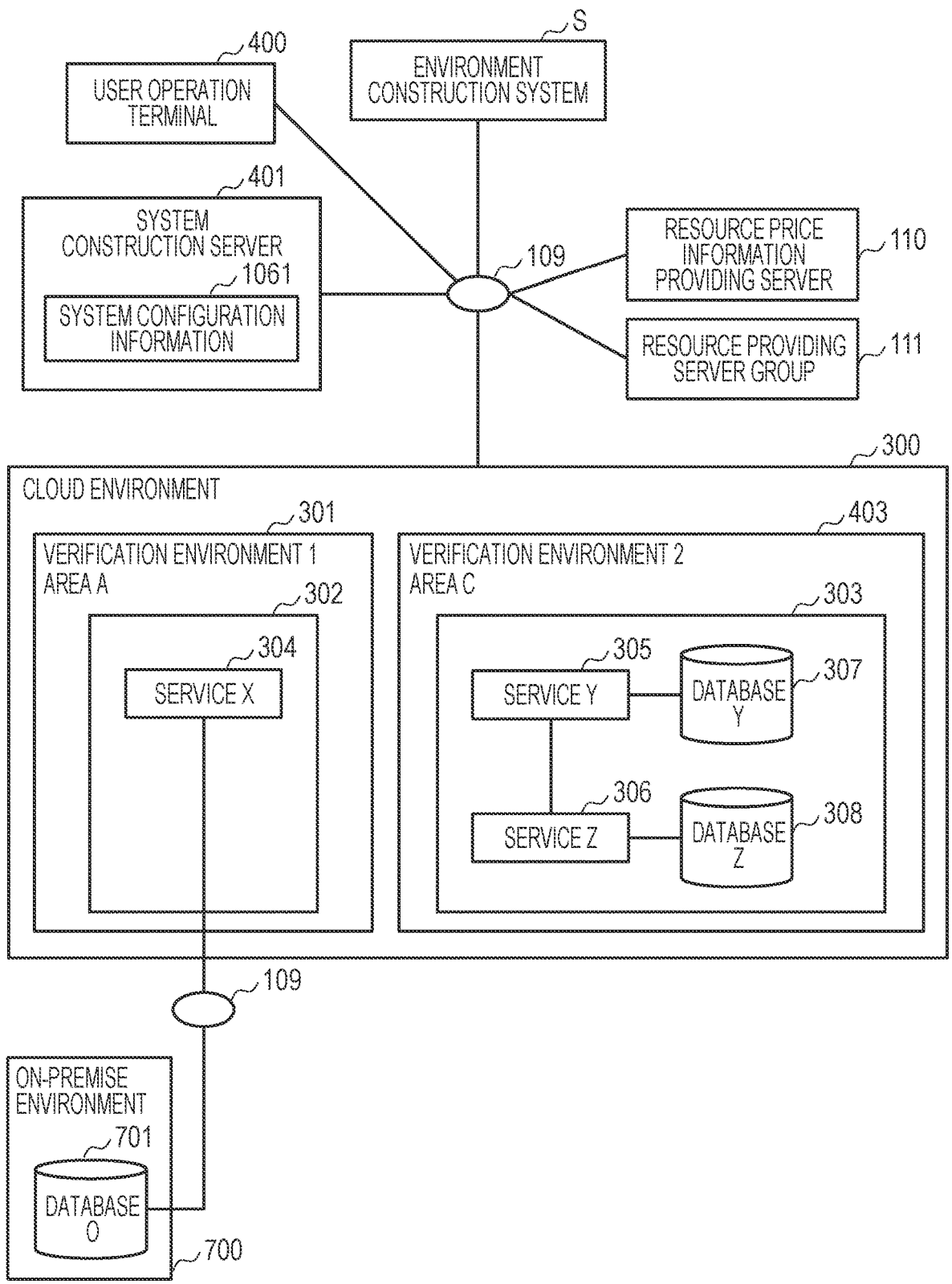
FIG. 9 is a diagram illustrating an example of system construction in a verification environment in the second embodiment.

FIG. 9 is a diagram illustrating an example of system construction in a verification environment according to the second embodiment.

In FIG. 9, the configuration of the verification environment constructed by the following description is described on the cloud environment 300. Other components except the network 109, the on-premises environment 700, and the database X701 connected to the cloud environment 300 are the same as the components illustrated in FIG. 4.

Figure 10:
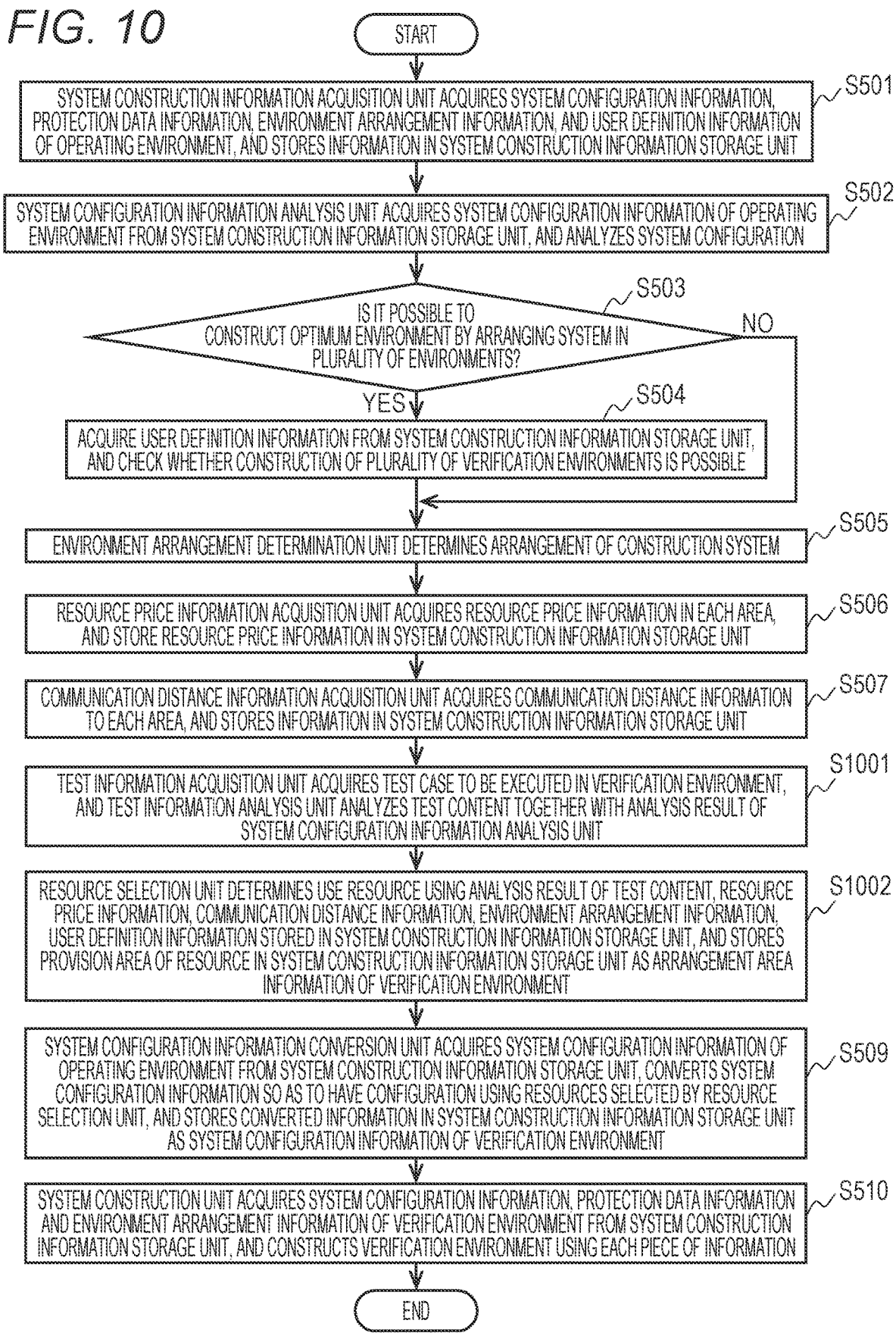
FIG. 10 is an example of a flowchart illustrating a flow of system construction processing to a verification environment in the second embodiment.

FIG. 10 is an example of a flowchart illustrating a flow of system construction processing to the verification environment in the second embodiment.

The flowchart illustrated in FIG. 10 is different from the flowchart illustrated in FIG. 5 in the first embodiment in that Step S1001 is added and Step S508 is replaced with Step S1002. Accordingly, portions different from those of the first embodiment will be mainly described below. Next, a system construction processing to the verification environment using the environment construction system S will be described with reference to a flowchart of FIG. 10.

Since the processing from Step S501 to Step S507 is the same as the processing in the first embodiment illustrated in FIG. 5, the description thereof will be omitted. It is assumed that the information stored in the system construction information storage unit 106 by the processing from Step S501 to Step S507 is similar to that in FIG. 2. It is assumed that the system configuration of the operating environment obtained in Step S502 is as illustrated in FIG. 7. In Step S503, similarly to the first embodiment, it is assumed that it is determined that it is optimal for the service execution unit 302 to construct the verification environment by resource selection prioritizing resource price reduction, and it is determined that it is optimal for the service execution unit 303 to construct the verification environment by resource selection prioritizing a communication distance with the operating environment.

Subsequently, the test information acquisition unit 600 acquires the test case information 800 to be executed in the verification environment. The test information analysis unit 601 analyzes the test contents by combining the test case information 800 and the analysis result by the system configuration information analysis unit 101 (S1001).

The test case information 800 may be input from the user operation terminal 400 by the user who conducts the test. The test information acquisition unit 600 may acquire the test case information 800 transmitted from the user operation terminal 400 to the environment construction system S via the network 109.

In the analysis of the test contents, it is determined whether the verification result is affected by the configuration of the verification environment using the test case information 800 and the information indicating the system configuration of the operating environment illustrated in FIG. 7. For example, Test case #1 is verification of transaction performance of a service X and a database X. If the verification accompanying the update of the service X304 is performed in the verification environment, the service execution unit 302 including the service X304 is constructed in the verification environment. However, since the database X701 is installed in the on-premises environment 700, if the verification environment is constructed in an area far away from the on-premises environment, the communication distance between the service X304 and the database X701 becomes long, and there is a possibility that the verification result of the transaction performance is affected. Therefore, it can be determined that the verification environment in which the service execution unit 302 including the service X304 is disposed should be an area close to the on-premises environment.

Similarly, when Test cases #2 and #3 are analyzed, it can be seen that all the test cases are verification contents closed inside the service execution unit 303. That is, for Test cases #2 and #3, it can be determined that the verification result is not affected by the area in which the verification environment is constructed.

Next, the resource selection unit 103 acquires the resource price information 1062, the communication distance information 1063, and the user definition information 1066 from the system construction information storage unit 106. Then, the resource selection unit 103 determines the optimum use resource on the basis of the acquired information and the analysis result of the test content in Step S1001. Then, the resource selection unit 103 registers the provision area of the determined use resource as arrangement area information of the verification environment in the environment arrangement information 1065 of the system construction information storage unit 106 (S1002).

As determined in Step S503, the verification environment 1 is constructed for the service execution unit 302 by performing resource selection prioritizing resource price reduction, and the verification environment 2 is constructed for the service execution unit 303 by performing resource selection prioritizing a communication distance with the operating environment. However, in the present embodiment, resource selection is performed in consideration of the analysis result (S1001) of the test content performed in the verification environment. For example, in Step S503, it has been determined that resource selection prioritizing resource price reduction is performed for the service execution unit 302, but in Step S1001, it is determined that the verification environment of the service execution unit 302 should be constructed in an area close to the on-premises environment 700. Considering the purpose of verification, it is important to reduce the influence on the verification result rather than the cost. Therefore, for the service execution unit 302, the same area A301 as the area where the operating environment is originally disposed is selected as the construction area of the verification environment 1. On the other hand, since the influence on the verification result is small for the service execution unit 303, as determined in Step S503, resource selection prioritizing the communication distance with the operating environment is performed, and an area C403 is selected as the construction area of the verification environment 2. The resource selection unit 103 registers the area selected in this manner as the arrangement area information of the verification environment in the environment arrangement information 1065 of the system construction information storage unit 106.

Hereinafter, since the processing from Step S509 to Step S510 is the same as that in the first embodiment, the description thereof will be omitted.

According to the present embodiment, in addition to the information of the system in the operating environment, the test content performed in the verification environment is also considered, so that the use cost of the resource and the communication distance can be optimized, and the verification environment corresponding to the legal system related to data protection can be dynamically constructed.

FIG. 11 is a diagram illustrating a hardware example of a computer that implements the environment construction system S of the present disclosure.

In a computer 1100 that implements the environment construction system S, a processor 1103 represented by a central processing unit (CPU), a memory 1104 such as a random access memory (RAM), an input device 1106 (for example, a keyboard, a mouse, a touch panel, or the like), and an output device 1107 (for example, a video graphics card connected to an external display monitor) are interconnected through a memory controller 1105.

In the computer 1100, a predetermined program is read from an external storage device 1108 such as a solid state drive (SSD) or a hard disk drive (HDD) via an input/output (I/O) controller 1102 and executed by cooperation of the processor 1103 and the memory 1104, thereby implementing the environment construction system S. Alternatively, each program for realizing the environment construction system S may be acquired from an external computer by communication via a network interface 1101. Alternatively, the program for realizing the region selection system S may be stored in a portable storage medium, read by a medium reading device, and executed by cooperation of the processor 1103 and the memory 1104.

In the first embodiment and the second embodiment, the case where the operating environment is constructed on the cloud has been described, but the operating environment may be constructed in an on-premises environment.

In the second embodiment, a method of constructing a verification environment in which eliminating the influence on the verification result is prioritized over cost in consideration of the test content performed in the verification environment has been described. However, by giving priority to eliminating the influence on the verification result, it is assumed that the cost increases and the user requirement is not satisfied. In fact, the resource price in the construction area (area A) of the verification environment selected in the second embodiment is $0.2/hour, which does not satisfy the user requirement described in the user definition information 1066. Therefore, in a case where it is determined that the user requirement is not satisfied in this manner, a process of confirming the construction method may be implemented for the user who uses the environment construction system S, and the verification environment may be constructed according to the determination of the user. In this case, the environment construction system S can realize the confirmation processing for the user by outputting information to the user operation terminal 400 via the network 109. The user can issue an instruction to the environment construction system S via the network 109 by inputting a method of constructing a verification environment to the user operation terminal 400.

Further, the invention is not limited to the above embodiments, but various modifications may be contained. For example, the above-described embodiments of the invention have been described in detail in a clearly understandable way, and are not necessarily limited to those having all the described configurations. Some of the configurations of a certain embodiment may be replaced with the configurations of the other embodiments, and the configurations of the other embodiments may be added to the configurations of a certain embodiment. Some of the configurations of each embodiment may be omitted, replaced with other configurations, or added to other configurations. Each step in the processing of each embodiment may be executed in an appropriately changed order as long as the same result can be obtained.

Each of the above configurations, functions, processing units, processing means, and the like may be partially or entirely achieved by hardware by, for example, designing by an integrated circuit. The configurations and the functions may be realized in software such that a processor analyzes and performs a program which realizes each function. Information such as a program, a table, and a file for realizing each function can be stored in a storage unit such as a memory, an HDD, or an SSD, or an IC card, a semiconductor recording medium, a magnetic recording medium, or an optical recording medium.

Only control lines and information lines considered to be necessary for explanation are illustrated in the drawings, but not all the control lines and the information lines for a product are illustrated. In practice, almost all the configurations may be considered to be connected to each other.

What is claimed is:

1. An environment construction system for reconstructing an information system constructed in a first environment into a second environment, the environment construction system comprising:
   a system construction information storage unit that holds, for an available resource that is a resource available for the second environment, resource price information indicating a price of the available resource and communication distance information indicating a distance of a communication path between the second environment and the first environment in a case where the available resource is used for the second environment;
   a system construction information acquisition unit that acquires system configuration information indicating a configuration of the information system and environment arrangement information indicating a physical location where the first environment is disposed;
   a system configuration information analysis unit that analyzes the system configuration information to generate an analysis result indicating a configuration of the information system;
   an environment arrangement determination unit that determines an environment arrangement policy indicating a requirement required for the second environment based on the analysis result;
   a resource selection unit that selects a resource to be used for the second environment from among the available resources based on the resource price information, the communication distance information, and the environment arrangement policy;
   a system configuration information conversion unit that converts the system configuration information to use the selected resource; and
   a system construction unit that constructs the second environment using the selected resource and constructs the information system in the second environment.

2. The environment construction system according to claim 1, wherein
   the system construction information acquisition unit further acquires user definition information describing first constraint information indicating a constraint condition on a number of the second environments to be constructed, and
   the environment arrangement determination unit determines a number of the second environments in the environment arrangement policy so as to satisfy a constraint condition of the first constraint information.

3. The environment construction system according to claim 1, wherein
   the system construction information acquisition unit further acquires user definition information describing second constraint information indicating a constraint condition on a price of a resource used in the second environment, and
   the resource selection unit selects a resource to be used for the second environment so as to satisfy a constraint condition of the second constraint information.

4. The environment construction system according to claim 1, wherein
   the system construction information acquisition unit further acquires user definition information in which third constraint information indicating a constraint condition on a distance of a communication path between the first environment and the second environment is written, and
   the resource selection unit selects a resource to be used for the second environment so as to satisfy a constraint condition of the third constraint information.

5. The environment construction system according to claim 1, wherein
   the system construction information acquisition unit further acquires protection data information describing whether data used by an information system constructed in the first environment is available in the second environment, and the system construction unit converts data for which the protection data information is not available in the second environment so as to conceal a portion requiring protection.

6. The environment construction system according to claim 1, further comprising a resource price information acquisition unit that acquires the resource price information from a provider of the available resource and stores the resource price information in the system construction information storage unit.

7. The environment construction system according to claim 1, further comprising a communication distance information acquisition unit that acquires the communication distance information and stores the communication distance information in the system construction information storage unit.

8. The environment construction system according to claim 1, further comprising:
- a test information acquisition unit that acquires test case information defining a content of a test for verifying performance of the information system and an expected value indicating performance expected in the test; and
- a test information analysis unit that analyzes the test case information to generate an analysis result indicating the content and the expected value,
- wherein the resource selection unit selects a resource to be used for the second environment such that the expected value is obtained when a test indicated by the analysis result is performed on the information system of the second environment.

9. An environment construction method for reconstructing an information system constructed in a first environment into a second environment, the environment construction method causing a computer to execute:
- holding, for an available resource that is a resource available for the second environment, resource price information indicating a price of the available resource and communication distance information indicating a distance of a communication path between the second environment and the first environment in a case where the available resource is used for the second environment;
- acquiring system configuration information indicating a configuration of the information system and environment arrangement information indicating a physical location where the first environment is disposed;
- analyzing the system configuration information to generate an analysis result indicating a configuration of the information system;
- determining an environment arrangement policy indicating a requirement required for the second environment based on the analysis result;
- selecting a resource to be used for the second environment from among the available resources based on the resource price information, the communication distance information, and the environment arrangement policy;
- converting the system configuration information to use the selected resource; and
- constructing the second environment using the selected resource and constructing the information system in the second environment.

* * * * *